(12) United States Patent
Gretz

(10) Patent No.: US 6,513,766 B1
(45) Date of Patent: Feb. 4, 2003

(54) LOCKING CABLE SUPPORT

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 09/956,614

(22) Filed: Sep. 19, 2001

Related U.S. Application Data

(63) Continuation-in-part of application No. 09/790,047, filed on Feb. 21, 2001.

(51) Int. Cl.[7] .................................................. F16L 3/08
(52) U.S. Cl. .................. 248/74.1; 24/16 PB; 24/598.2; 248/62; 248/68.1; 248/69; 248/74.2; 248/74.3
(58) Field of Search ........................... 248/69, 68.1, 73, 248/74.1, 74.3, 62, 49; 24/16 PB, 255, 598.2, 601.1, 600.9; 174/72 A

(56) References Cited

U.S. PATENT DOCUMENTS

| | | | |
|---|---|---|---|
| 2,417,261 A | | 3/1947 | Morehouse |
| 2,972,461 A | * | 2/1961 | Balbach et al. ............. 248/68.1 |
| 3,051,424 A | * | 8/1962 | Duhamel ...................... 248/62 |
| 3,432,129 A | | 3/1969 | Santucci |
| 3,913,187 A | | 10/1975 | Okuda |
| 4,317,262 A | * | 3/1982 | Wells, Jr. .................... 24/16 PB |
| 4,439,896 A | * | 4/1984 | Matsui ....................... 24/16 PB |
| 4,609,171 A | * | 9/1986 | Matsui ........................ 248/74.3 |
| 4,674,720 A | * | 6/1987 | Fetsch ......................... 248/74.1 |
| 5,639,049 A | * | 6/1997 | Jennings et al. ............ 248/74.2 |

* cited by examiner

Primary Examiner—Leslie A. Braun
Assistant Examiner—Tan Le

(57) ABSTRACT

A locking cable support that reduces potential wire abrasion, minimizes magnetic interference to communication signals, and provides a wide opening feature that permits easy insertion of cables without first twisting them. The shape and flexibility of the improved locking cable support enable it to be opened wider than prior art metallic bridle rings, allowing easier insertion of wires. Non-metallic construction minimizes potential wire abrasion and reduces the possibility of magnetic interference with communication signals. A wide surface in the ring portion provides a comfortable seat for cables with minimal bending of cables between supports.

11 Claims, 3 Drawing Sheets

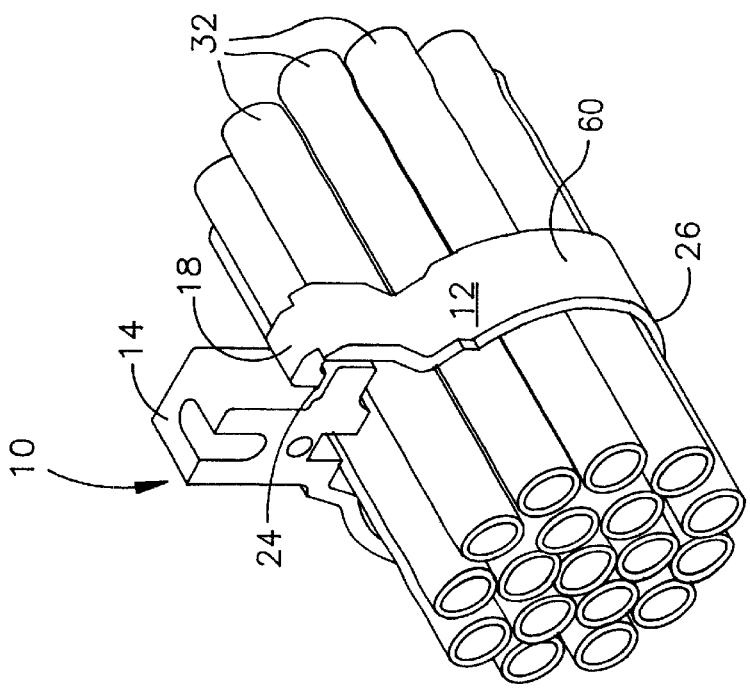
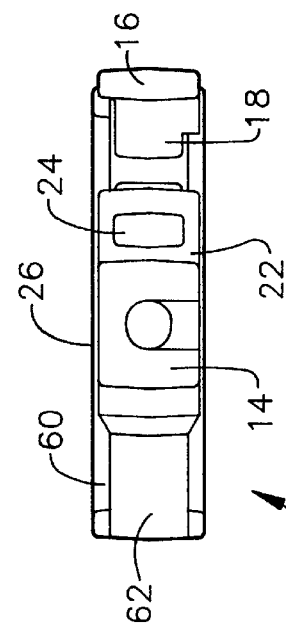
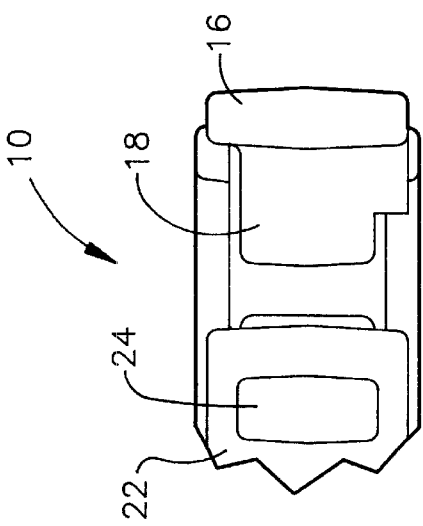
FIG. 6
FIG. 5
FIG. 4

LOCKING CABLE SUPPORT

This application is a Continuation-In-Part of U.S. Patent Application entitled "Bridle Ring for Electrical and Communication Cable" filed Feb. 21, 2001, application Ser. No. 09/790,047 and still pending.

FIELD OF THE INVENTION

This invention relates to cable supports and specifically to an improved locking cable support that is of non-metallic construction. Non-metallic construction prevents abrasion of cables held within the cable support, minimizes the possibility of unwanted magnetic fields interfering with signals running through communication cables within the cable support, and eliminates corrosion. The shape and flexibility of the improved cable support enable it to be opened wide, thereby permitting insertion of bundles of cables or individual cables without distorting the cables. The cable support of the present invention includes an improved locking feature whereby the ends of the ring snap together easily and are held more securely than previous versions of the ring.

BACKGROUND OF THE INVENTION

When used in the electrical industry, the term "bridle ring" usually refers to a cable hanger that is constructed from a rod of steel. It is generally a one-piece rod of steel bent into a circular hoop with a connection mechanism, such as a threaded connector or a friction clip, at one end. It is typically used to support horizontal or vertical runs of electrical cables by suspending the cables through the hoop section of the bridle ring.

Typically, the hoop section of prior art rings is not quite 360° in radius, providing a small gap for insertion of cables. As a consequence of the limited size of the gap in prior art bridle rings and the rigid construction, cable bundles do not fit in prior art bridle rings. The gap in prior art bridle rings is so narrow that cable bundles cannot be fit into them.

Standards for telecommunication cabling systems are given in ANSI/TIA/EIA-568. Within this standard, three types of cables are recognized for horizontal cabling and include 4-pair 100 ohm UTP (unshielded twisted pair) cable, 2-pair 150 ohm STP (shielded twisted pair) cable, and 2-fiber, 62.5/125 micron optical fiber cable. Category 5 cable refers to a designation applied to UTP (unshielded twisted pair) cable whose transmission characteristics are specified up to 100 MHz.

When running communication cables with the existing art bridle rings, it is common for the individual cables in the bundle to be bent, twisted, or otherwise damaged as a result of the limited size of the gap, the rigid construction, and the small diameter of the metal rod utilized in constructing the ring. The metal rod that the bridle ring is constructed from is typically 0.25" in diameter and can disturb the small cables that are typically within Category 5 cable. Bending and twisting of conductors caused by prior art bridle rings can adversely affect the data transmission rate in Category 5 cable.

Some manufacturers have attempted to correct the deficiencies of existing art bridle rings by attaching a curved piece of plastic to provide a better surface for supporting the cables. The piece of plastic is typically snapped on in a separate operation and adds to the expense of the existing art bridle ring.

The disadvantages of existing art bridle rings are:
(a) The rigid ring and narrow gap causes distortion of individual cables or separation of the twisted pair in UTP cable.
(b) It is impossible to fit bundles of cables into the narrow gap, as it is too small to accommodate them.
(c) The small diameter of the hoop portion of the bridle ring can cause damage to the individual small wires in communication cable bundles.
(d) The surface that the cable bundles rest upon is not sufficiently wide to provide a comfortable seat for the wires.

OBJECTS OF THE INVENTION

The invention is an improved cable support that provides support for cables similar to that provided by prior art bridle rings but without the several disadvantages inherent in the prior art. Since it is of non-metallic construction, the cable support of this invention reduces the possibility of abrasion occurring to cables held within its ring portion, minimizes the possibility of unwanted magnetic fields interfering with signals running through the cables, and eliminates corrosion. The shape, material of construction, and flexibility of the locking cable support enable it to open wider than prior art metallic bridle rings. As a result of the wider opening, installers may gather cables together and insert them within the ring portion with much less twisting and thereby reduce the stress applied to the cables. Distortion of individual cables or separation of the twisted pairs within UTP cable is thereby averted. The wide opening ring of the locking cable support allows easy insertion of bundles of cables. Within the locking cable support of the present invention, a wider ring portion provides a better resting surface and minimizes damage to cables held therein. A snap-fit feature is provided to enable easy installation of cables in the locking cable support of the present invention.

SUMMARY OF THE INVENTION

Several advantages of the locking cable support of the present invention are:
(a) A wide opening feature is provided, thereby allowing cable insertion without first twisting them, minimizing separation of twisted pairs within UTP cable, and allowing insertion of bundles of cables into the ring portion of the present invention.
(b) The ring portion is of a larger diameter than prior art bridle rings, therefore minimizing potential damage to the small wires in communication cables.
(c) The surface that the cables rest upon is significantly wider than the seat in prior art bridle rings and therefore provides a more comfortable seat for the wires.
(d) A snap lock feature is provided for locking the two ends of the cable support after installation of telecommunication cables.

DESCRIPTION OF THE DRAWINGS

FIG. 4 is a top sectional view showing the latch and a small portion of the locking cable support including the pocket.

FIG. 5 is a top view of the locking cable support of FIG. 1.

FIG. 6 is a perspective view of the locking cable support of FIG. 1, as it would appear with a cable bundle running through the ring portion.

Table of Nomenclature

| Part No. | Part Description |
| --- | --- |
| 10 | locking cable support |
| 12 | ring portion |
| 14 | head portion |
| 16 | leverage arm |
| 18 | latch |
| 20 | nose (of latch) |
| 22 | head extension |
| 24 | pocket |
| 26 | cable rest (broad surface) |
| 32 | communication cable |
| 34 | end (of ring) |
| 36 | inner portion (of head extension) |
| 38 | outer portion (of head extension) |
| 40 | lip (on nose portion of latch) |
| 42 | top side (of head extension) |
| 44 | bottom side (of head extension) |
| 46 | side (of nose portion) |
| 48 | side (of lip) |
| 50 | adjacent portion (of leverage arm) |
| 52 | channel |
| 54 | lower surface (of latch) |
| 56 | upper surface (of lip) |
| 58 | gap |
| 60 | lower portion (of ring) |
| 62 | upper portion (of ring) |
| 64 | nub |

DESCRIPTION OF THE INVENTION

Figure 1:
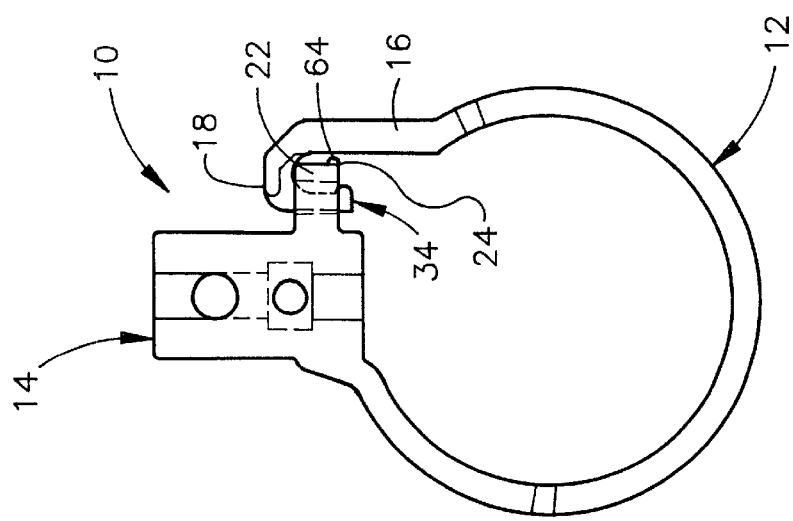
FIG. 1 is a plan view of the locking cable support of the present invention in its closed configuration.

The present invention consists of a locking cable support. Referring to FIG. 1, a plan view of the preferred embodiment in its closed configuration, the locking cable support 10 includes an integral head 14 and ring 12. The ring 12 extends in a circular shape from one side of the head 14 to an end 34 near the opposite side of the head. A leverage arm 16, integral with the end 34 of the ring 12, extends outward from the central axis of the cable support 10 and includes a latch 18 extending toward the head 14. The head may contain a threaded rod (not shown in FIG. 1) to facilitate easy screw-on attachment to a beam clamp or could employ any common techniques for attachment to a beam. An integral head extension 22 extends outwardly from the head 14 toward the leverage arm 16 and latch 18 and includes an integral nub 64 and a latch-receiving pocket 24 (in dashed lines).

Figure 2:
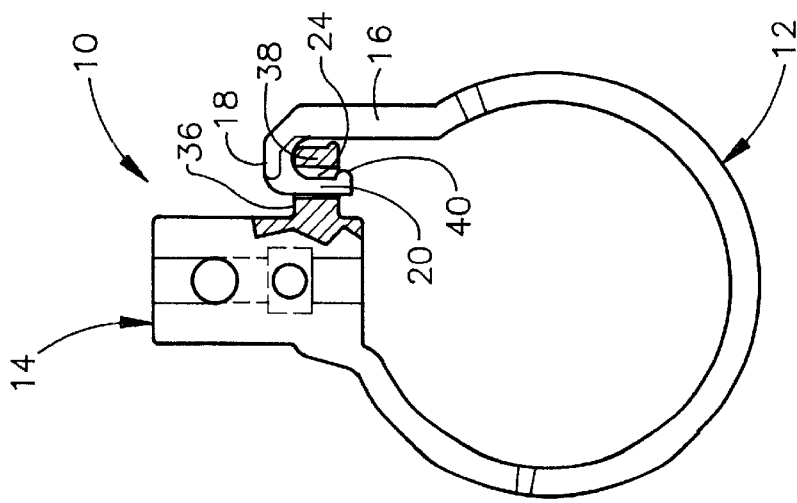
FIG. 2 is a plan view of the locking cable support of FIG. 1 in its closed configuration and with a portion of the latch-receiving pocket broken away.

FIG. 2 is a plan view of the locking cable support of FIG. 1 in its closed configuration and with a portion of the head extension 22 broken away to show the latch-receiving pocket 24. Two portions of the head extension 22, delineated by the pocket 24, may be defined as an inner portion 36 and outer portion 38. The latch 18 includes an integral nose portion 20 and a lip 40 extending toward the leverage arm 16.

Figure 7:
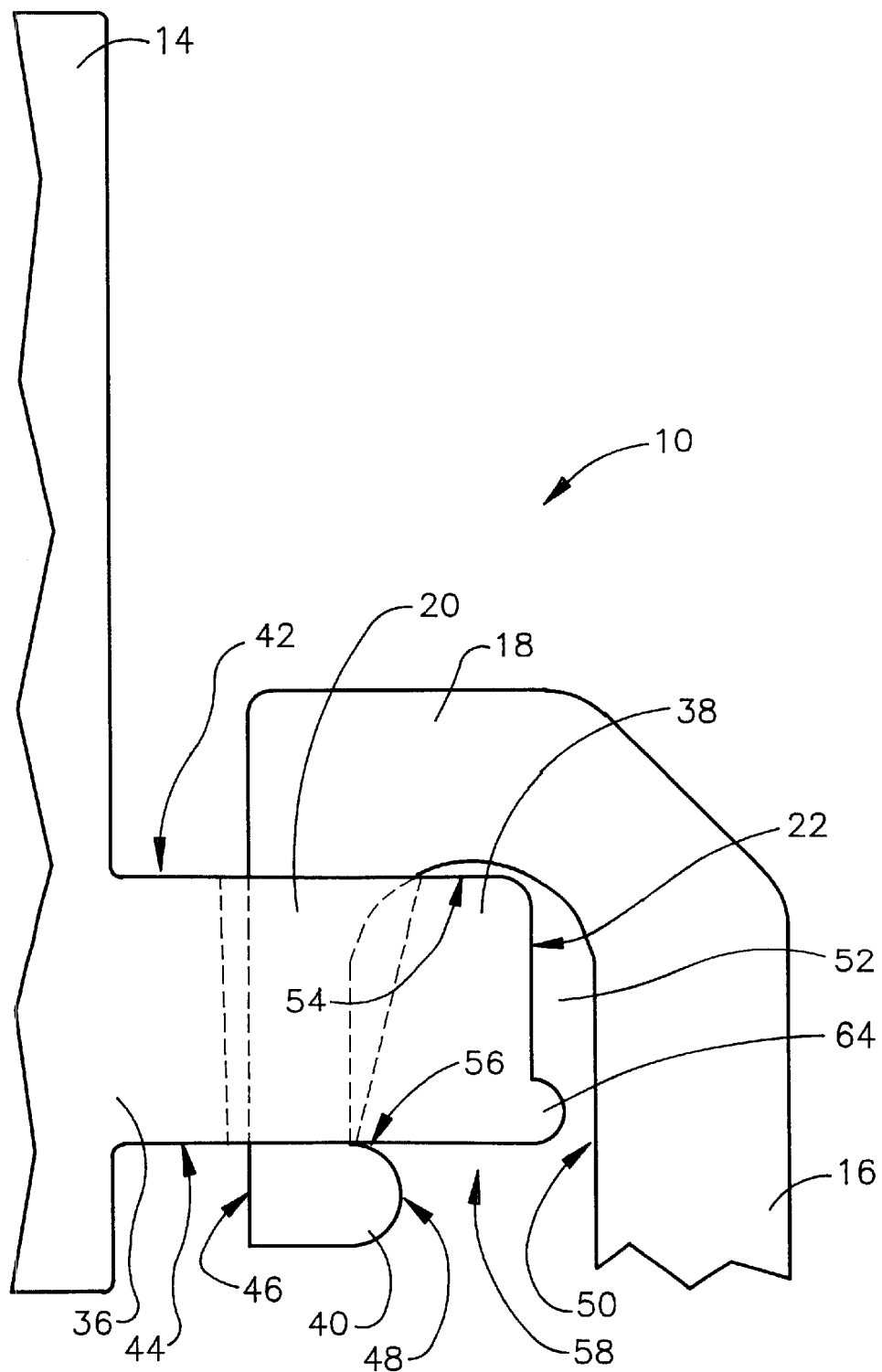
FIG. 7 is a detailed drawing of a portion of the locking cable support of FIG. 1 after the two ends have been snapped together.

The locking cable support is provided with a snap-fit feature that allows the ring to be firmly snapped together. FIG. 7 is a detailed drawing of a portion of the ends of the locking cable support where they snap fit together including the head extension 22 and leverage arm 16. As shown in FIG. 7, the latch-receiving pocket 24 (in dashed lines) is an aperture formed within the head extension 22. The part of the head extension 22 nearest the head 14 may be referred to as the inner portion 36 and the part nearest the leverage arm 16 may be referred to as the outer portion 38. After a cable bundle is slipped into the ring (not shown in FIG. 7), the installer would snap the nose portion 20 (shown in dashed lines) of the latch 18 into the latch-receiving pocket 24. The latch-receiving pocket 24 is of a wider dimension on the top side 42 of head extension 22 than on the bottom side 44 as shown by the dashed lines in FIG. 7. The nose portion 20 including its integral lip 40 are of a size, shown by the distance between side 46 and side 48 in FIG. 7, slightly smaller than the narrowest portion of the latch-receiving pocket 24. The distance across the nose portion 20 and lip 40 is typically 0.141 inch and the narrowest portion of the latch-receiving pocket 24 is typically 0.168 inch. A gap 58 exists between side 48 of the lip 40 and the adjacent side 50 of the leverage arm 16. As an installer presses the ring together to close it, the nose portion 20 and lip 40 enter the top entrance of the pocket 24 and slide downward toward the narrow end of the pocket 24. As the nose portion 20 and lip 40 progress further into the pocket 24, the nub 64 on the outer portion 38 of the head extension 22 is brought in contact with the adjacent portion 50 of the leverage arm 16. The distance across the top 42 of the outer portion 38 is typically 0.130 inch, the gap 58 typically measures 0.159 inch, and the distance across the bottom 44 of the outer portion 38, including the nub 64, is typically 0.180 inch. As the distance across the top of the outer portion is 0.130 inch, it easily enters the gap 58, which measures 0.159 inch. As the nose portion 20 is pushed farther into the narrowing pocket 24, it is pried away from the leverage arm 16 by the longer bottom surface of the outer portion 38 and nub 64 (0.180 inch). As the nose portion 20 and lip 40 finally clear the bottom side 44 of the head extension 22, the nose portion 20 and lip 40 snap back into their unbiased position as a result of the resilient material of construction of the cable support. This completes the installation of the cable support as the latch 18 with its integral nose portion 20 and integral lip 40 portions snap lock around the outer portion 38 of the head extension 22. FIG. 7 depicts the locking cable support after the two ends are snap locked together. The outer portion 38 of the head extension 22 is held within a channel 52, defined as the area bordered by the nose portion 20 to the left of the outer portion 38, the adjacent portion 50 of the leverage arm 16 to the right of the outer portion 38, the latch 18 above the outer portion 38, and the lip 40 below the outer portion 38 as shown in FIG. 7. The outer portion 38 of the head extension 22 is held tightly in the channel 52 by the tight fit between the lower surface 54 of the latch 18 and the upper surface 56 of the lip 40 pressing upon the top 42 and bottom 44 sides of the outer portion 38 of the head extension 22. Typically, the distance between the lower surface 54 of the latch 18 and the upper surface 56 of the lip 40 is 0.251 inch and the size of the outer portion 38 from the top 42 to bottom 44 sides is 0.249 inch.

Figure 3:
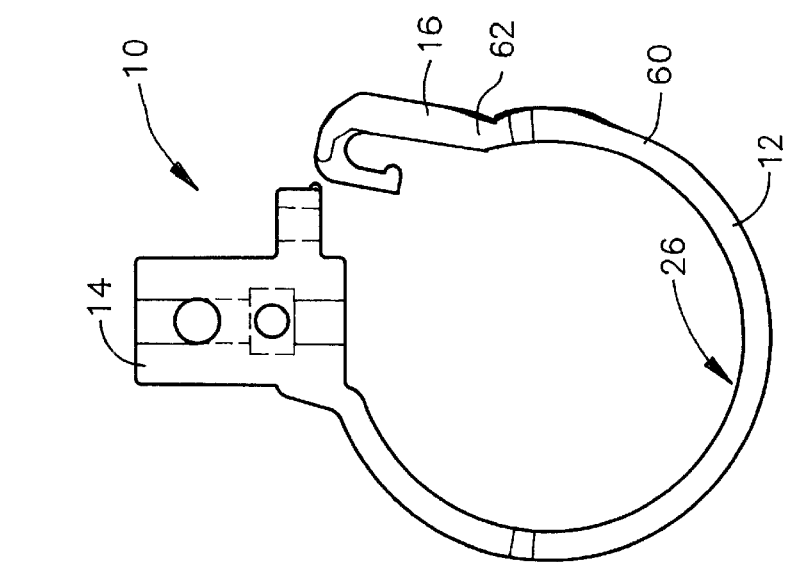
FIG. 3 is a plan view of the locking cable support of FIG. 1 in its open configuration.

Referring to FIG. 3, the locking cable support 10 is shown in its open position. As a result of its resilient material of construction, the ring can be opened much wider by grasping the head 14 in one hand and the leverage arm 16 in the other and using a slight amount of force. If desired, the ring 10 may be opened as wide as the full diameter across the ring. This feature of the locking cable support 10 allows insertion of large bundles of cable (not shown in FIG. 3) without the need to twist the bundles. Prior art bridle rings are rigid and have a set opening which is usually quite small, necessitating the twisting of cable bundles to make them fit into the ring. The cable support 10 includes a lower portion 60 that is of a wider band width than the upper portion 62. The lower portion 62 is wider and serves as a cable rest.

Referring to FIG. 4, a broken away portion of the head extension 22 is shown including the latch-receiving pocket 24. The latch 18 extends from the leverage arm 16. The integral nose portion 20 with its integral lip 40 (not shown in FIG. 4) will be inserted into the latch-receiving pocket 24 when desired to snap fit the two ends of the ring together.

The locking cable support of the present invention is typically provided in two standard sizes, 2.5-inch and 4-inch. The size designations refer to the outer diameter across the closed ring. Although offered in 2 ½ and 4-inch versions, the ring could be made to many other sizes, if desired, to accommodate differing sizes of cables or cable bundles. Although the ring diameters are different in the 2 ½ and 4-inch rings, the dimensions of the snap fit mechanism typically remain the same for both versions. The width of the ring portion may vary however, as explained in conjunction with the next drawing figure.

Referring to FIG. 5, a top view of the locking cable support 10 in an open configuration, the head extension 22 is an integral extension of the head 14. The relative locations of the head 14, head extension 22, latch-receiving pocket 24, and latch 18 are shown. As shown in FIG. 5, the lower portion 60 of the locking cable support 10 has a wider band width than the upper portion 62 of the ring. The lower portion 60 forms a wide cable rest 26 that provides support for inserted wire bundles (not shown in FIG. 5) and by virtue of its wide dimension minimizes strain and bending of individual cables. The band width is typically 0.625 inch for a standard 2.5-inch locking cable support, which is much wider than the typical 0.250 inch diameter of prior art bridle rings. The band width of a standard 4.0-inch locking cable support typically would be in the range of 0.625 to 1.25 inch.

FIG. 6 is a perspective view of the closed locking cable support 10, as it would appear with a number of typical telecommunication cables 32 running through the ring portion 12. The head 14 is typically connected to a beam or other support (not shown in FIG. 6). The latch 18 is shown locked into place in the pocket 24 (only a portion of which is shown in FIG. 7). The width of the lower portion 60 of the ring 10 constitutes the cable rest 26, and as shown in FIG. 7 is quite wide to provide adequate support to the cable bundle. The cable rest 26 constitutes a significant improvement in easing stresses on the wires and reducing potential abrasion. The elasticity and resiliency of the plastic material of construction, typically nylon or polypropylene, is such that the ring 10 may be opened as wide as the full diameter of the ring. This wide opening feature of the present invention allows the ring to be opened as wide as the inner diameter across the ring portion 12, thereby allowing cable bundles to be easily laid into the ring with no twisting. The snap fit feature allows installers to quickly complete the installation.

Although the description above contains many specific descriptions and proposed sizes, these should not be construed as limiting the scope of the invention but as merely providing illustrations of some of the presently preferred embodiments of this invention. Typical sizes are provided to illustrate a given embodiment of the present invention and should not be construed as limiting its scope.

Thus the scope of the invention should be determined by the appended claims and their legal equivalents, rather than by the examples given.

What is claimed is:

1. A locking cable support comprising:
   a head, said head including an arrangement for attachment to a beam or similar support, said head including a head extension;
   a ring integral with said head, said ring extending from said head and terminating in an end near said head extension;
   a leverage arm integral with and extending from the end of said ring, said arm extending substantially beyond the periphery of said ring;
   an integral latch extending from said arm, said latch including an integral nose portion;
   a latch-receiving aperture located in said head extension, said latch-receiving aperture dividing said head extension into an inner and an outer portion;
   said arm including an adjacent portion including the surface of said arm facing said outer portion of said head extension;
   a snap-locking mechanism including an integral lip on said nose portion, with said lip, said nose portion, and said adjacent portion of said arm defining a channel capable of receiving said outer portion of said head extension; and
   said latch-receiving aperture is wider at the top side of said head extension than at the bottom side of said head extension.

2. The locking cable support of claim 1 which is constructed of an elastic material such as nylon or polypropylene.

3. The locking cable support of claim 1 wherein the band width of said ring is typically in the range of 0.625 to 1.25 inch.

4. The locking cable support of claim 1 wherein said ring may be grasped by said arm and said head and opened essentially to the fall diameter of said ring.

5. The locking cable support of claim 4 wherein said ring and said head return to close proximity to each other in their relaxed state when an opening force is removed from said arm and said head.

6. The locking cable support of claim 1 wherein said a narrowest portion of said latch-receiving aperture typically measures 0.168 inch and said width of said lip and said nose portion typically measures 0.141 inch.

7. The locking cable support of claim 1 including a gap defined by the space between said lip and said adjacent portion of said arm.

8. The locking cable support of claim 7 wherein said gap is narrower than the widest part of said outer portion of said head extension.

9. The locking cable support of claim 8 wherein said gap typically measures 0.159 inch and said widest part typically measures 0.180 inch.

10. The locking cable support of claim 1 wherein said ring extends from said side of said head opposite said head extension in a circular shape.

11. The locking cable support of claim 1 wherein said ring extends from said side of said head opposite said head extension in a polygonal shape.

* * * * *